United States Patent
Probst et al.

[11] Patent Number: 6,038,505
[45] Date of Patent: Mar. 14, 2000

[54] METHOD OF CONTROLLING THE DRIVE TRAIN OF A MOTOR VEHICLE, AND INTEGRATED DRIVE TRAIN CONTROL SYSTEM

[75] Inventors: Gregor Probst, Landshut; Friedrich Graf, Regensburg; Roman Strasser, Burgkirchen, all of Germany

[73] Assignee: Siemens Aktiengesellschaft, Munich, Germany

[21] Appl. No.: 08/937,256

[22] Filed: Sep. 12, 1997

[30] Foreign Application Priority Data

Sep. 12, 1996 [DE] Germany ............... 196 37 209

[51] Int. Cl.⁷ ............................. B60K 41/04; F02D 28/00
[52] U.S. Cl. .................................... 701/65; 701/54
[58] Field of Search .................... 701/51, 58, 60, 701/54, 53, 65, 207, 208, 213; 477/20, 107, 109, 110; 340/438, 439

[56] References Cited

U.S. PATENT DOCUMENTS

| | | | |
|---|---|---|---|
| 4,866,622 | 9/1989 | Dreher et al. | 701/102 |
| 5,504,482 | 4/1996 | Schreder | 340/995 |
| 5,521,823 | 5/1996 | Akita et al. | 364/424.05 |
| 5,555,170 | 9/1996 | Nakashima | 364/424.1 |
| 5,716,301 | 2/1998 | Wild et al. | 477/97 |
| 5,893,894 | 4/1999 | Moroto et al. | 701/53 |

FOREIGN PATENT DOCUMENTS

| | | |
|---|---|---|
| 0576703A1 | 1/1994 | European Pat. Off. |
| 0 745 788 A1 | 12/1996 | European Pat. Off. |
| 0 766 024 A2 | 4/1997 | European Pat. Off. |
| 4039005A1 | 6/1991 | Germany |
| 4401416A1 | 7/1995 | Germany |
| 2 240 194 | 7/1991 | United Kingdom |
| 88/05199 | 7/1988 | WIPO |

OTHER PUBLICATIONS

"Systemvernetzung im Automobil", R. Leonhard, Stuttgart, Feinwerkstechnik im Fahrzeugbau, München, 1993, pp. 87–90.

"Fahrzeugregelung und regelungstechnische Komponentenabstimmung", U. Zoelch et al., VDM Berichte No. 1225, 1995, pp. 281–297, pertains to motor vehicle control and closed–loop/open–loop control adjustment.

*Primary Examiner*—Michael J. Zanelli
*Attorney, Agent, or Firm*—Herbert L. Lerner; Laurence A. Greenberg; Werner H. Stemer

[57] ABSTRACT

The drive train of a motor vehicle is controlled by interpreting the position of the accelerator pedal as a wheel torque or transmission output torque desired by the driver. This information is utilized together with the position of the brake pedal for calculating central control parameters for the drive sources and decelerating units of the drive train. Data on local environmental pollution are taken into account in such a way that a drive mode of the motor vehicle, ascertained to whatever the current environmental conditions are, is ascertained and indicated to the driver. Unless the driver rejects this drive mode for special reasons, it is performed automatically.

9 Claims, 3 Drawing Sheets

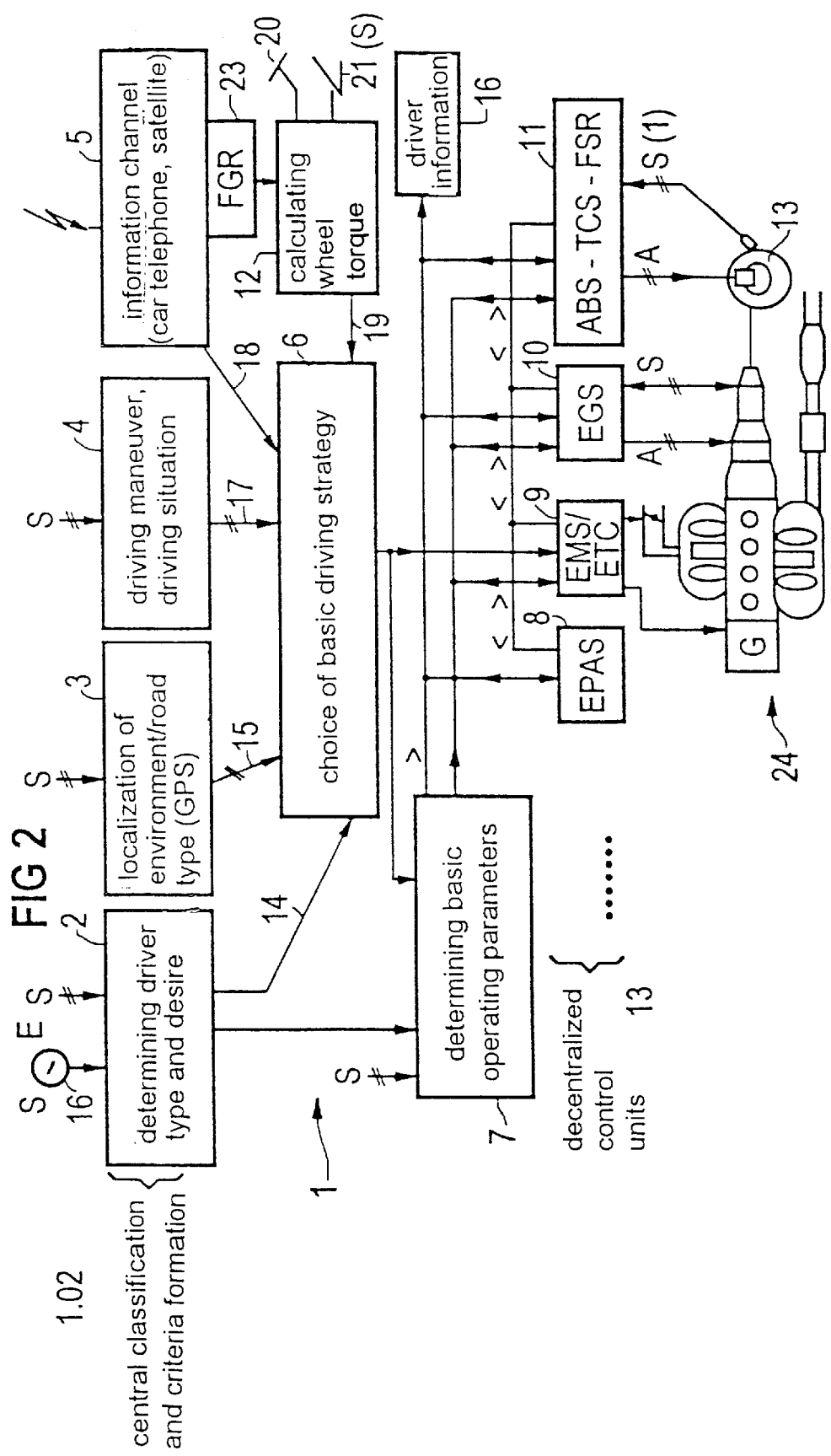

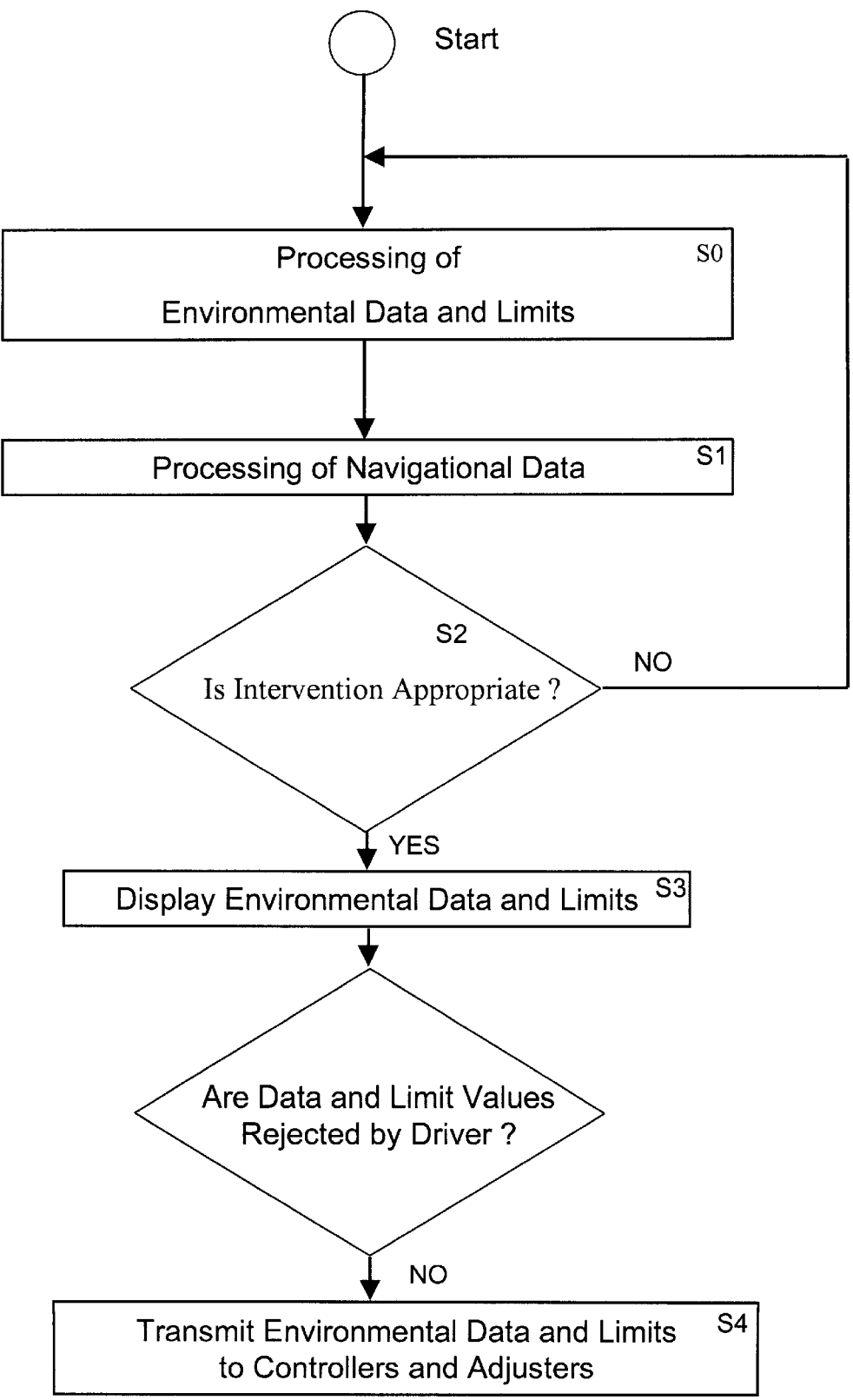

METHOD OF CONTROLLING THE DRIVE TRAIN OF A MOTOR VEHICLE, AND INTEGRATED DRIVE TRAIN CONTROL SYSTEM

BACKGROUND OF THE INVENTION

Field of the Invention

The invention pertains to motor vehicles, and particularly to a method of controlling the drive train of a motor vehicle and to an integrated drive train control system.

Prior art control systems for the engine, transmission and secondary assemblies of a motor vehicle operate largely independently; that is, they establish the operating point and operating mode of the controlled assembly largely independently of one another. Means are also available for communication among the various components of the drive train of a motor vehicle, for instance in the form of a CAN bus or the like, but these means are predominantly used only for exchanging sensor data in the course of multiple utilization. Moreover, the control systems affect one another by means of communication in certain operations, for instance to make for smoother shifting by reducing the engine torque upon a change of transmission ratio in the transmission.

Other examples include engine drag torque control during braking, and braking intervention or torque reduction in traction control if drive slip arises. A system for linking together systems in the automobile has become known heretofore that seeks an integrated drive train control system for a motor vehicle by means of which the position of the accelerator pedal is interpreted as a wheel torque or transmission output torque desired by the driver and used for calculating desired values for the engine and transmission of the motor vehicle (F & M 101 (1993) 3, pp. 87–90). The goal of the overriding optimization proposed in that publication, of the parts of the system embodied by the engine control unit, electronic accelerator pedal and transmission control unit, is to reduce fuel consumption and to improve the drivability, in particular with regard to the spontaneous reaction to movements of the accelerator pedal.

The drive train (engine, transmission, differential, drive wheels) can be optimized by taking into account the following various criteria dynamically during one drive cycle: drive mode (for example, sporty or economy). In general, the driver always remains the chief decision maker for these optimization criteria, even in metropolitan areas with heavy traffic, traffic jams, and variable ozone concentrations. Moreover, increasing numbers of driver support systems are becoming established in vehicles, such as vehicle navigation systems with multimedia characteristics (radio, telephone, etc.) and the capability of receiving information during a trip.

SUMMARY OF THE INVENTION

It is accordingly an object of the invention to provide a method of controlling the drive train of a motor vehicle and an integrated drive train control, which overcomes the above-mentioned disadvantages of the prior art devices and methods of this general type and which is improved in terms of the operation of a motor vehicle by making joint use of the information systems, available during the trip, for additionally controlling the drive train. This is important because in view of the ever more stringent emission limit values, some regulation of the driver in urban traffic appears conceivable in future. The possibilities for reducing fuel consumption without regulating driver behavior run up against their limits. The emissions (hydrocarbons, nitrogen oxides, etc.) should be reduced as extensively as possible, especially in urban areas.

With the foregoing and other objects in view there is provided, in accordance with the invention, a method of controlling a drive train of a motor vehicle, which comprises the following steps:

interpreting a position of an accelerator pedal as a wheel torque or transmission output torque desired by a driver of the motor vehicle, and calculating, from the position of the accelerator pedal, desired values for an engine and a transmission of the motor vehicle;

receiving, with a calculation device, signals representing the position of the accelerator pedal and a position of a brake pedal, and generating from the signals central control parameters for drive sources and decelerating units of the drive train of the motor vehicle;

delivering to the data calculation device data on local environmental pollution and taking the data into account in the generating step such that a driving mode of the motor vehicle is adapted to current environmental conditions and is indicated to the driver; and automatically activating an operating mode adapted to the current environmental conditions.

In accordance with an added feature of the invention, the data on local environmental pollution are received via radio transmission by a receiver in the motor vehicle and are transmitted to the data calculation device through an information channel. In the alternative, the data on local environmental pollution are measured directly in the motor vehicle and the data are furnished in the information channel.

In accordance with an additional feature of the invention, the method takes into account locally prescribed environmental limits in the control of the drive train.

In accordance with another feature of the invention, a classification device evaluates sensors signals from the drive train, and classifies operating parameters of the motor vehicle.

In accordance with a further feature of the invention, a current vehicle position is determined, and the system intervenes in the control of the drive train in response to the environmental data only if such intervention is appropriate and does not impair the drive safety of the automobile.

With the above and other features in view, there is also provided, in accordance with the invention, an integrated drive train control system for a motor vehicle having an accelerator pedal, a brake pedal, and a drive train with drive sources and decelerating units. The novel control system comprises:

a calculation device receiving a signal representing a position of the accelerator pedal and of the brake pedal respectively, the calculation device interpreting the position of the accelerator pedal as a wheel torque or transmission output torque desired by the driver of the motor vehicle;

an information channel connected to the calculation device, the information channel furnishing to the calculation device data on local environmental pollution;

the calculation device generating central control parameters for the drive sources and the decelerating units of the drive train on the basis of the respective positions of the brake pedal and the accelerator pedal, and taking into account the data on local environmental pollution such that a driving mode of the motor vehicle is adapted to the environmental conditions through the central control parameters.

In accordance with again an added feature of the invention, the system further comprises a selection circuit for selecting a driving strategy from output signals of the classification circuit and of the information channel; a control circuit programmed to perform a coordinated calculation of the central operating parameters of the drive train in accordance with the selected driving strategy; and a plurality of decentralized control units connected to receive output signals of the calculation device and of the selection circuit, the control units generating control signals for the engine, transmission and brake system of the motor vehicle.

In accordance with a concomitant feature of the invention, there is provided a device for receiving the data on local environmental pollution by radio transmission, the device being connected to and furnishing the data to the information channel.

Other features which are considered as characteristic for the invention are set forth in the appended claims.

Although the invention is illustrated and described herein as embodied in a method for controlling the drive train of a motor vehicle, and integrated drive train control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a schematic view detailing an integrated drive train control system with which the method of the invention is performed; and FIG. 3 is a flowchart of the program run by the drive train control system of FIG. 2.

DESCRIPTION OF THE PREFERRED EMBODIMENTS

Figure 1:
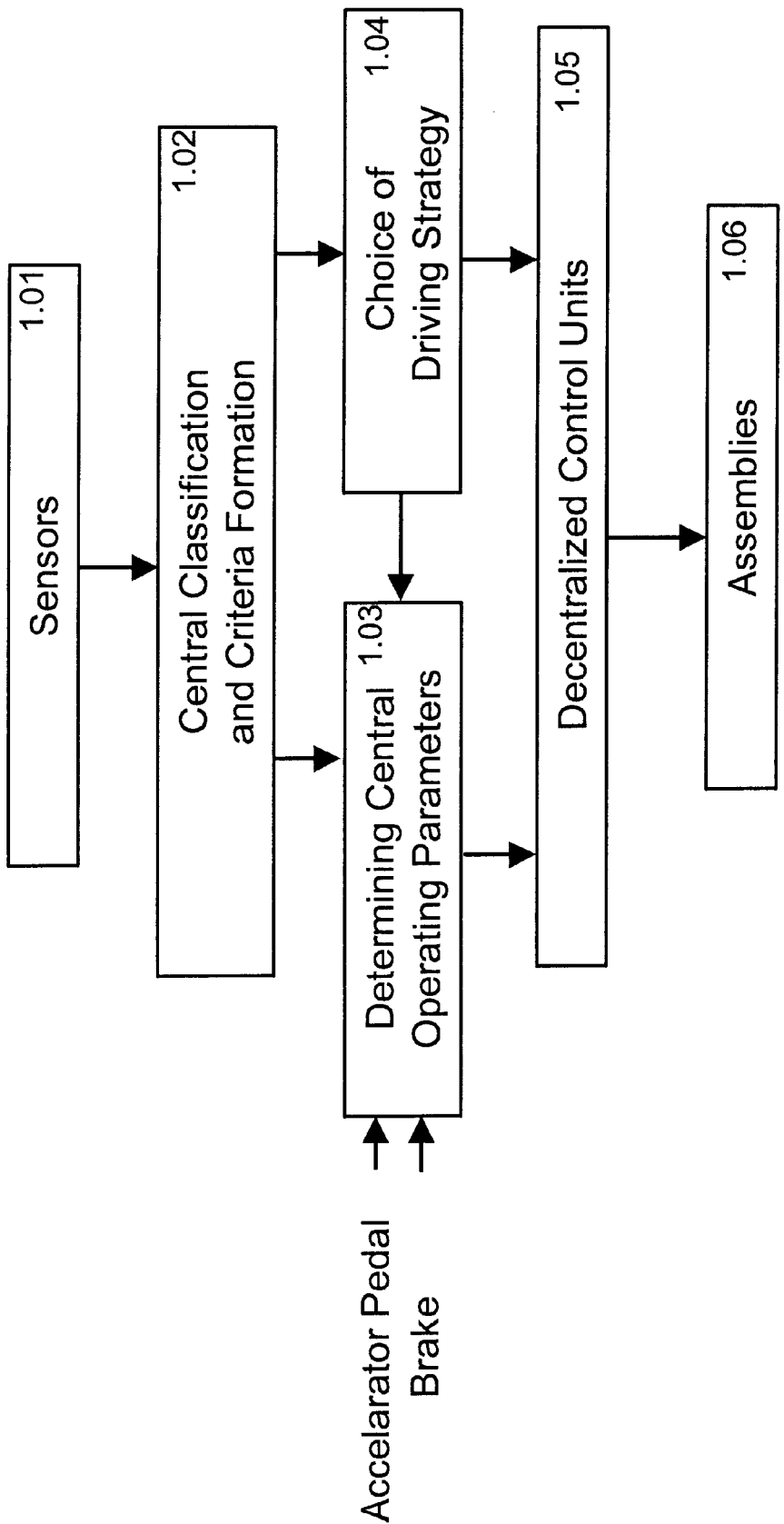
FIG. 1 is a block circuit diagram showing the hierarchical structure or architecture of an integrated drive train control system according to the invention.

Referring now to the figures of the drawing in detail and first, particularly, to FIG. 1 thereof, there is seen an integrated drive train control system 1. For reasons of simplicity and for the sake of better readability, the terms "circuit" and "block" will be omitted for the individual circuit or program components (for example, selector rather than selection circuit).

The components are as follows: sensors 1.01, combined symbolically into one block; a central unit for classification and criteria formation 1.02; a central unit for determining operating parameters 1.03, to which the signals from the accelerator pedal and the brake pedal of the motor vehicle are delivered; a driving strategy selector 1.04; decentralized control units 1.05 combined in a block; and the assemblies 1.06 of the drive train to be controlled, for example the engine, the transmission, and the brakes of the motor vehicle.

The function and the mode of operation of the components in FIG. 1 will now be described in conjunction with the description of the other drawing figures.

The integrated drive train control system 1 is shown in more detail in FIG. 2. It has the following components in the central classification and criteria formation block 1.02: a driver type and driver demand determining circuit 2, an environment type and road type localization means 3 (for example via GPS), a driving maneuver and driving situation detection means 4, and an information channel 5 (for instance, a car phone or a satellite receiver). The circuits 2–5 and other circuit components to be described below in the drive train control system 1 are supplied with the signals from various sensors in the motor vehicle, here symbolically represented by the letter S, over suitable signals lines. The signal lines are shown in the drawing as multiple lines but may also be embodied as a data bus (such as a CAN bus).

A basic driving strategy selector 6, via lines 14–18, receives output signals from the aforementioned circuits 2–5. Via a line 19, it receives the output signal of a wheel torque calculation device 12, which in turn receives signals from a brake pedal 20 and an accelerator pedal or gas pedal 21.

Output signals of the basic driving strategy selector 6 are delivered to a basic operating parameters determining means 7, also called a control circuit, and to an electronic engine controller and engine performance adjusting unit 9. The output signals of the basic operating parameters determining means 7 proceed to a driver information block or display 16, an electrical power assist steering system (EPAS) 8, an electronic engine control system (EMS/ETC) 9, an electronic transmission control (EGS) 10, and a brake controller 11, which can include an ABS system, a traction control system TCS, and a drive stability control system FSR.

The basic operating parameters determining means 7 now, in accordance with the specifications from the driving strategy selector 6, carries out a coordinated calculation of the central operating parameters of the entire drive train. For example, it defines the transmission ratio and the desired engine torque, and moreover the drive type and in the case of a hybrid drive its individual operating points as well. This enables a substantially more comprehensive control of the engine and transmission than before: the engine torque can be adjusted as a function of the transmission ratio. This increases the drivability of the motor vehicle, since the driver on upshifting no longer has to compensate for a loss of output torque. Moreover, pollutant emissions can be effectively reduced, as will be explained later herein.

The coordinated definition of the operating parameters takes place not only in a steady state, that is, not only at a constant wheel torque demand, by the wheel torque calculation device 12; on the contrary, information on dynamic events, such as cornering or a transition to the overrunning mode (the vehicle speed is reduced), are taken into account by the basic operating parameters determining means 7 as well, in order to coordinate the function units 8–11 that follow it. For instance, in the case of overrunning, the current transmission ratio can be retained and at the same time the overrunning shutoff can be activated. In cornering on extremely sharp curves, it is appropriate to maintain driving stability that the transmission ratio be fixed by the transmission controller (EGS) 10 and that a load change in the drive train be damped or made to proceed more slowly by the electronic engine controller and engine performance adjusting unit (EMS/ETC) 9.

Centralization for the sake of drivability or drive mode management and emissions management is done only as much as necessary, however, in the form of strategy specification. All the other functions (such as the functions that assure driving stability) proceed as much as possible at the level of the decentralized control units.

The control circuits or devices 8–11 produce adjusting signals with which the individual assemblies or components of the drive train 24 of the motor vehicle are controlled, that is, the engine via its throttle valve, the transmission, and the brakes of the motor vehicle. The adjusting signals pass over lines A from the circuits 9–11 to the assemblies of the drive train; sensor signals S are carried over corresponding lines to the aforementioned circuits. The control circuits or devices 8–11 may, however, also be put together as so-called on-site units with whichever assembly is to be controlled, or can be integrated with it. For instance, it is appropriate for the controller 11, especially in the case of an electrical brake actuator, to be combined with the brake actuator. This changes nothing in terms of the control function.

The individual components of the drive train itself are shown toward the bottom of FIG. 2 and will not be explained further here because they are well known. In the case of a hybrid drive—that is, an internal combustion engine combined with an electric motor—the former is coupled to an electric motor and a generator G. One such hybrid drive is known for instance from VDI-Bericht [VDI Report; VDI= Association of German Engineers] No. 1225, 1995, pp. 281, 297.

Examples of a global or combined drive train control system according to the invention are as follows:

1. A minimized emissions mode (HC, $NO_x$):

The basic driving strategy selector 6 defines the operating mode of the entire drive train for minimized pollutant emissions.

A central "decider" in the form of the basic operating parameters determining means 7 accordingly defines the essential operating parameters of the circuits 9–11 (EMS, ETC, EGS) for a strategy such that pollutant emissions are minimized (for instance in urban areas). This specification can be converted by the following function units as follows:

ETC (electronic engine performance controller): load changes (demanded by unit 12) of the engine are damped (slowed down), or the operating range is restricted. By avoiding non-steady-state events, closed-loop and open-loop control systems that seek a reduction in emissions can operate without error. Operating ranges with quantitatively or qualitatively undesired emissions composition are avoided.

EMS (electronic engine control): activation of a low-emissions mode, for instance in the engine by reducing fuel enrichment upon acceleration, or changing the drive type (for instance to electric motor, hydrogen drive)

EGS (electronic transmission control): brings about the most steady-state operation mode possible for the engine in a range with minimum emissions, for instance with CVT or in a many-geared transmission;

adaptation upon a change of driving type (such as electric motor, hydrogen drive): particularly in this function, good cooperation of engine and transmission is important (coordinated by unit 7), because the driver demand with regard to acceleration and speed allows more combinations of resultant engine torque and transmission ratio. An adapted course of the change over time in the two controlling variables is also necessary.

2. A performance-oriented mode. Analogously to the minimized emissions mode, all the decentralized function units are adjusted such that the best possible acceleration and rapid response of the drive train to driver demands (unrestricted drive type) are available. This is necessary in the sporty driving mode or in driving uphill.

FIG. 1 shows the architecture of such a functional layout. However, decisions at lower control levels that affect higher specifications are signaled as much as necessary to the higher control levels. But this will also be explained in conjunction with FIG. 2, whose function will now be explained in detail.

The block (or circuit) 2 serves to determine the driver type, that is, to make a classification expressing a distinction between performance-oriented and economy modes. One example of such a function is described in European Patent Disclosure EP 0 576 703 A1. A signal characterizing the driving style of the driver is delivered to a basic driving strategy selector 6 via a line 14.

Block 3 ascertains the road type (city/highway/expressway/overland road), but also can determine the general degree of air pollution, for instance, via additional sensors. If the specific location of the vehicle is known by GPS (global positioning system) in conjunction with a digital card (on CD ROM), then this information on the local air pollution can be made available to block 6.

A detection, performed in block 4, of individual driving maneuvers, such as cornering, an uphill grade, drive and brake slip, and information on longitudinal and transverse stability can also be utilized to ascertain the driving strategy choice. This information can also be made available to block 7, so that by way of a medium-term operating strategy it is also possible in the short term to achieve a suitable operating mode of the drive train. The information for blocks 6 and 7 can also originate in decentralized control units (for instance, information on the dynamic driving stability from the ABS/TCS/FSR control unit 11) or from the information channel 5. Block 5 furnishes information that is supplied by a central "control point", such as a traffic monitoring agency. This makes regional, centralized control of low-emissions operating modes possible.

The reception of the transmitted local environmental data, such as the ozone level and local environmental limit values, in the information channel 5, as well as the vehicle coordinates, received in the localization means 3, for instance via GPS, and the evaluation of these data in the basic driving strategy selector 6 put the drive train control system 1 in a position to regulate the operating mode as a function of the various maximum limit values permitted. This is indicated to the driver via the driver information block 16.

If the driver accepts this emissions-reducing operating mode adapted to the environmental pollution, then the closed-loop and open-loop control devices 8, 9, 10 and 11 of the drive train are automatically controlled by the basic driving strategy selector 6 in such a way that the driver demands are overridden, and the motor vehicle is operated in a low-emissions mode, to suit local environmental conditions and regulations. However, if the driver considers it necessary, he can reject the emissions-reducing driving mode, for instance by actuating a switch, and choose some other driving strategy or keep the one he is currently using. For instance while passing, which is relevant to safety, he can choose a sporty driving strategy. In such safety-relevant situations, which are detected by block 4 and which require that the performance be briefly maximized, the driving mode can also be changed (from economy to sporty).

In addition, whatever the current vehicle position is also checked for plausibility. The environmental data and environmental limit values received and processed are then used for the drive train control system only if this is appropriate.

For example, if the vehicle is traveling in towns, then a minimized-emissions operating mode is activated. In rural areas, conversely, a control intervention with a reduction in performance is not performed.

Via the display or gauge 16, the driver receives information on current environmental values (that is, the hydrocarbons, nitrogen oxides, ozone, carbon monoxide and carbon dioxide, soot particles, etc., in the ambient air) and on the local environmental limit values permitted. If suitable sensors are present in the motor vehicle, then the environmental values can also be measured directly in the motor vehicle and sent to the basic driving strategy selector 6. The steps taken for environmentally protective control of the drive train will be described hereinafter in conjunction with FIG. 3.

Block 6 serves to ascertain the choice of basic driving strategy for the following unit 7, which in turn in coordinated fashion defines the central operating parameters for the decentralized control units. The information on the lines 14, 15, 17 and 18 is compared with a fixed set of rules. This is accomplished with a fuzzy system, mathematically formulated algorithms, or a neural network.

The sensors S furnish necessary signals both for forming the classification and criteria in the top most layer of the drive train control system 1, that is, in the units 2–5, and for the decentralized control units for the individual assemblies. The location of the sensors with regard to the function blocks plays a subsidiary role, as long as communications between the sensor signal processing in the respective control unit (ECU) and the information sink are assured. Nor does it matter, with regard to the functional architecture, which function units are physically located in which ECU and combined with it. Thus it is entirely possible to integrate the driver type and driver demand determining means in the transmission control system (EGS) 10, while the environmental and road type classification can be accommodated in block 11 (regulation of longitudinal and transverse dynamics). A central computer can also contain the units 12, 6, 7. What is essential is the virtual architecture, as shown in FIG. 2, for attaining overall improved function. An important role is played here by the communications between the physical units, which are expediently embodied in the form of fast serial bus communication (for instance via a CAN bus).

The specifications by the driver expressed through the accelerator pedal or gas pedal are converted in block 12 into a desired wheel torque specification or a desired transmission output torque, that is, the torque that is transmitted from the drive wheels to the roadway. The influence of environmentally dictated factors, such as additional driving resistance (mountain driving, vehicle load), are not meant to be taken into account here, so as not to alienate the driver from the physical reality.

Block 12 is shown separately in FIG. 2, but it can also be accommodated physically in the decentralized control units 8–11 or 16 (for instance in EMS/ETC). The same is true for blocks 1–7. The signal on line 19 can be output as a wheel torque or transmission output torque desired by the driver, or as a desired circumferential wheel force or a desired transmission output torque. By means of continuous information via the brake pedal 20, it is also possible to specify negative desired wheel torques or desired circumferential wheel forces. Hence integrated management of driving units (such as the engine, electric motor, rotating flywheel) or decelerating units that absorb energy (such as the service brake, generator, or a flywheel not in motion) are possible. As an alternative to driver specification of the wheel torque, this wheel torque can also be specified by a cruise control 23 (FGR for short).

The information channels between block 7 ("basic operating parameter determination") and the units 9, 10 and 11 can be used bidirectionally. The reason for this is the necessity, in the calculation of the basic operating parameters, of using not only such external conditions as driver type, environment and driving maneuvers as the basis but also of taking into account internal specified operating states of the controlled units in the drive train. For instance, it is important after a cold start to run the engine at elevated rpm in order to reinforce the warm-up of the catalytic converter. Moreover, additional load sources (such as an electrically heated catalytic converter) represent an additional load on the engine output. Retarding the ignition timing after a cold start (optionally blowing in secondary air) for the same purpose changes the characteristics of the drive train and must be taken into account by the unit 7 (for instance, by postponing gear shifting points to higher engine rpm levels).

A particular operating state in the transmission can likewise affect the calculation of the transmission ratio (such as cold transmission fluid when the torque converter lock up is turned on; at excess transmission temperature, it is appropriate to shift engine rpm levels to ranges that increase the volumetric throughput of the oil pump of the transmission through the oil cooler). Other interventions in the engine torque, such as increasing it in order to compensate for the loss of torque by the air conditioning compressor or losses of efficiency in the transmission (CVT: adjusting the transmission ratio dictates a greater pumping power), take place on the control level represented by blocks 8–11, unless they also have to be supported by other provisions in block 7.

By means of the drive train control system of the invention, not only the gear shifting behavior in driving uphill and downhill or in the event of performance demands oriented to driving style and driving situation, but also the control of the entire drive train, including the drive sources, are subjected to different criteria from the usual ones.

For instance it may be appropriate and necessary, in critical situations and driving maneuvers, to adapt the current transmission ratio (keep it unchanged) in a situation-oriented way, specifically regardless of whatever general strategy has just been set. Such dynamic corrections are functionally combined, in the control concept of the invention, with the control of the engine (one example is the coordinated lock up of a gear and activation of the engine overrunning shutoff).

It is appropriate not yet to include engine-specific parameters in block 12 (wheel torque calculation), because after all, in a hybrid drive, for instance, the choice of driving type is not yet fixed at this decision level. However, it is useful to include such conditions as traction conditions (winter driving, a gravel road) and above all in highly motorized vehicles preventively to reduce the sensitivity of the system somewhat (to generate less wheel torque or transmission output torque with the accelerator pedal in the same position). In general, the conversion of the accelerator pedal position into a wheel torque or transmission output torque can be done with a fuzzy system, which combines the multiple dependencies into a desired wheel torque or transmission output torque.

The advantages of the invention also reside in an integrated wheel torque management, which processes the wheel torque or transmission output torque as a negative value as well and that influences both drive sources and the units that slow down the vehicle. It is especially simple to couple it with brake systems that have electrical brake actuation ("brake by wire").

In block 7, not only the transmission ratios and the respective desired engine torque but also the driving type and the individual operating points thereof are defined. Not only is a strictly wheel torque-oriented mode by driver specification possible, but by centralized specifications in terms of pollutant emissions, the real wheel torque or transmission output torque can also be varied or limited. However, such interventions must be displayed to the driver through block 16 and must be done as much as possible without restrictions to drive mode adjustment.

Blocks 2–6 and 12–16 may be accommodated in independent physical units (control units) or can be integrated with the units 8–11. This flexibility is yet another advantage of the invention.

The data exchange among the individual control units is done in torque-based fashion. The term "torque-based" is understood as follows: If the transmission demands a reduction in engine torque, for instance, then it forwards a variable to the engine controller, which represents the desired torque or in other words the desired engine torque and does not for instance demand an ignition angle reduction by 5%. Conversely, to ascertain the engine torque at the current operating point, for instance of the transmission controller, it is not the throttle valve position and engine rpm that are transmitted, from which the transmission controller could ascertain the current engine torque via a matrix stored in memory in the transmission controller; instead the engine controller, via an interface (such as CAN), transmits the current engine torque to the transmission controller.

FIG. 3 shows a flowchart for the sequence performed by the drive train control system 1 of the invention. After the Start, the program executes the following steps S1–S4:

S0 reception and processing of local environmental data and local environmental limit values, or online measurement of the environmental data in the vehicle;

S1 reception and processing of navigation data to determine the vehicle position;

S2 inquiry whether the environmental data and environmental limit values received and processed make a control intervention (by the basic driving strategy selector 6) appropriate in view of the current vehicle position; if not, then the process returns to the start; if an intervention is appropriate, the process continues with:

S3 display of the current environmental data and environmental limit values on a driver information system (display 16);

S4 Unless rejected by the driver, the environmental data and limit values are transmitted to the adjusting members and controllers (7, 9, 10, and optionally 8, 11) of the drive train.

This completes one cycle of the program. It is executed anew at predetermined time intervals or cyclically.

It is particularly advantageous that on the one hand the operating mode of the motor vehicle, adapted to whatever the current environmental conditions are, is ascertained on an ongoing basis and displayed to the driver. If the driver does not reject this driving mode for special reasons, then on the other hand, the driving mode adapted to the current environmental conditions is executed automatically.

We claim:

1. A method of controlling a drive train of a motor vehicle, which comprises:

interpreting a position of an accelerator pedal as a torque selected from the group consisting of a wheel torque and a transmission output torque desired by a driver of the motor vehicle, and calculating, from the position of the accelerator pedal, desired values for an engine and a transmission of the motor vehicle;

receiving, with a calculation device, signals representing the position of the accelerator pedal and a position of a brake pedal, and generating from the signals central control parameters for drive sources and decelerating units of the drive train of the motor vehicle;

delivering to the data calculation device data on local environmental pollution and taking the data into account in the generating step such that a driving mode of the motor vehicle is adapted to current environmental conditions and is indicated to the driver; and automatically activating an operating mode adapted to the current environmental conditions.

2. The method according to claim 1, wherein the data on local environmental pollution are received via radio transmission by a receiver in the motor vehicle and are transmitted to the data calculation device through an information channel.

3. The method according to claim 1, which comprises measuring the data on local environmental pollution in the motor vehicle and furnishing the data in an information channel.

4. The method according to claim 1, which comprises taking into account locally prescribed environmental limits in the control of the drive train.

5. The method according to claim 1, which further comprises evaluating, in a classification device, sensors signals from the drive train, and classifying operating parameters of the motor vehicle.

6. The method according to claim 1, which comprises determining a current vehicle position, and intervening in the control of the drive train in response to the environmental data only if such intervention is appropriate and does not impair safety.

7. An integrated drive train control system for a motor vehicle having an accelerator pedal, a brake pedal, and a drive train with drive sources and decelerating units, the control system comprising:

a calculation device receiving a signal representing a position of the accelerator pedal and of the brake pedal respectively, said calculation device interpreting the position of the accelerator pedal as a torque selected from the group consisting of a wheel torque and a transmission output torque desired by the driver of the motor vehicle;

an information channel connected to said calculation device, said information channel furnishing to said calculation device data on local environmental pollution;

said calculation device generating central control parameters for the drive sources and the decelerating units of the drive train on the basis of the respective positions of the brake pedal and the accelerator pedal, and taking into account the data on local environmental pollution such that a driving mode of the motor vehicle is adapted to the environmental conditions through the central control parameters.

8. The drive train control system according to claim 7, which further comprises:

a classification circuit including said information channel and additional circuits, said classification circuit providing output signals;

a selection circuit for selecting a driving strategy from said output signals of said classification circuit;

a control circuit programmed to perform a coordinated calculation of the central operating parameters of the drive train in accordance with the selected driving strategy; and a plurality of decentralized control units connected to receive output signals of said control circuit and of said selection circuit, said control units generating control signals for the engine, transmission and brake system of the motor vehicle.

9. The drive train control system according to claim 7, which further comprises a device for receiving the data on local environmental pollution by radio transmission, said device being connected to and furnishing the data to said information channel.

* * * * *